Feb. 8, 1966 V. J. LUNDELL 3,233,394
FORAGE CROP WAFERING MACHINES
Filed Oct. 11, 1963

INVENTOR.
VERNON J. LUNDELL
BY Wolfe, Hubbard,
Voit & Osann
ATTORNEYS.

United States Patent Office 3,233,394
Patented Feb. 8, 1966

3,233,394
FORAGE CROP WAFERING MACHINES
Vernon J. Lundell, Cherokee, Iowa, assignor to Massey-Ferguson Services N.V., Curacao, Netherlands Antilles, a corporation of the Netherlands
Filed Oct. 11, 1963, Ser. No. 315,440
2 Claims. (Cl. 56—1)

The present invention relates generally to agricultural machines of the type finding particular utility in the treatment of forage crops. It concerns more particularly improvements in such machines for picking up previously cut crop material and delivering it into the machine for formation thereby into wafers.

Recently there have been developed machines of practical usefulness for converting forage crop material, such for example as alfalfa, into relatively small, dense, uniform blocks which are called wafers. These machines include means for chopping and co-mingling stems and leaves of the crop material and a wafering mechanism for receiving that material and for compacting it into wafer form. The wafering mechanism includes a series of die cells and means for urging the comminuted crop material into and through the cells so as to thereby form it into wafers.

For treating by such machines forage crop material not uncommonly is cut and is allowed to fall back upon the remaining stubble for drying there or it is windrowed for that purpose. Subsequently and usually when the moisture content of the cut forage crop material is sufficiency reduced to approximately 20% or less by weight, the crop material is picked up and wafered. The stubble, that is to say the rooted stem portions of the crop, which portions are left standing upon cutting the crop material, serves not only to hold the cut portions of the material in a somewhat elevated position facilitating drying, but also the stubble is often capable of renewed growth and further crop production. The cut hay presses down the stems and also tends to become entangled in the stubble. This makes subsequent picking up of the cut material difficult, and it impairs future stubble growth.

The present invention lies in the provision in a wafering mechanism intended primarily for field use not only of means for comminuting and co-mingling stems and leaves of the crop material and delivering the same for transfer to the machine's wafering mechanism for compaction into wafers, but also of means for picking up previously cut crop material, which may or may not have been windrowed, to the end that substantially all of the cut crop material is picked up and the stubble is freed for regrowth.

Figure 1:
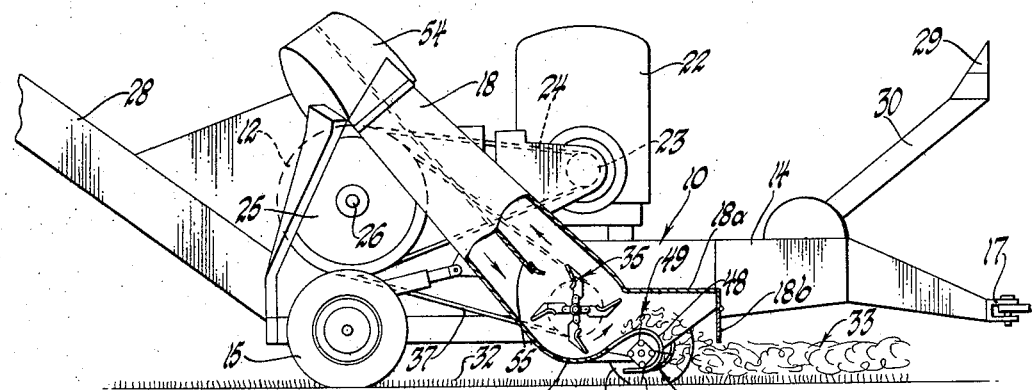
Figure 2:
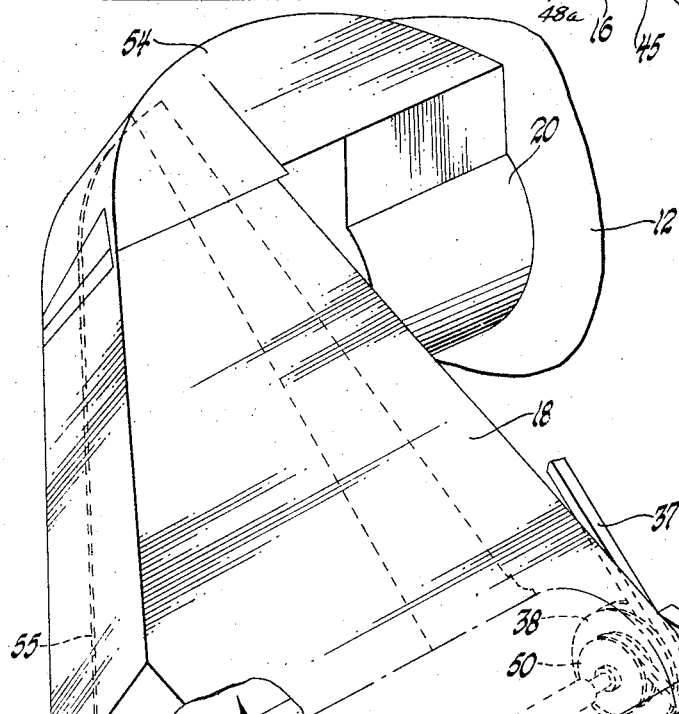
Figure 2:
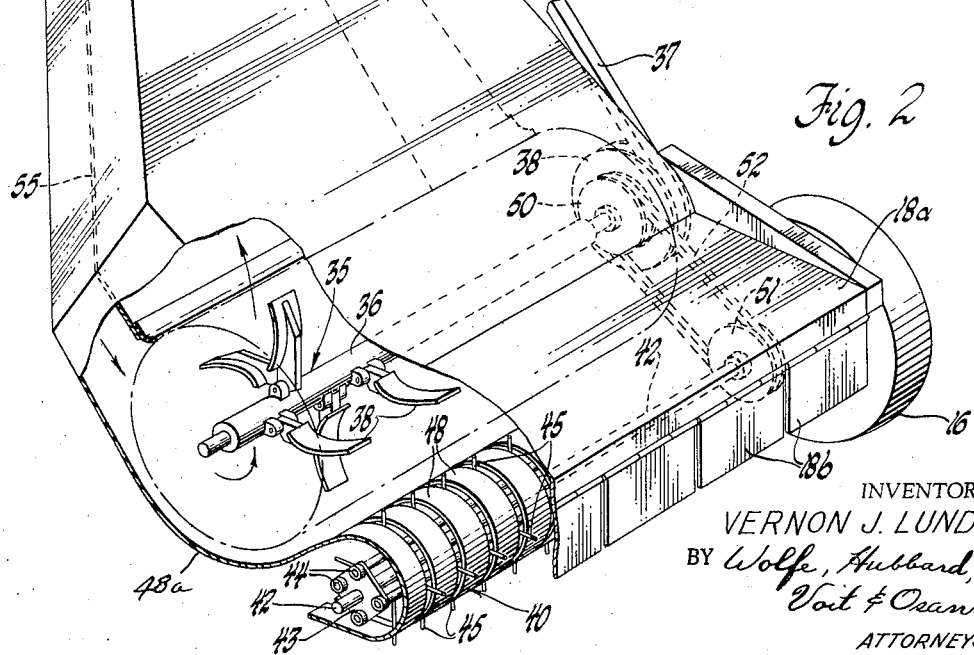

An example of a wafering machine embodying the present invention is shown in the accompanying drawing, in which:

FIGURE 1 is a side elevational view, partly in section, of a machine embodying the present invention; and FIG. 2 is a fragmentary oblique, front perspective of the leading end portion of the machine of FIGURE 1.

While the invention is illustrated and described in connection with a particular embodiment, it is to be understood that the invention is not to be limited to that particular embodiment. On the contrary, it is intended to include all alternative constructions and modifications that are embraced within the spirit and scope of the invention as expressed in the appended claims.

Referring more particularly to the drawing, there shown is a wafering machine generally designated by the reference numeral 10. The machine includes a wafering mechanism 12 which is mounted upon the rear end portion of a frame 14. The frame is equipped with ground-engaging wheels 15 and 16 upon which the machine can be drawn through a field of hay or other forage crop. At its forward end the frame 14 terminates in a hitch 17 for connection with a draft vehicle such as a tractor (not shown). The machine 10 includes a delivery chute 18 as shown, which is mounted at the right side of and is carried by the frame 14 for receiving comminuted crop material and directing it to transfer means, including a hopper 20, for delivering the material to the wafering mechanism 12.

An output conveyor 28 is provided, which extends upwardly and rearwardly from the rear end portion of the machine for receiving and delivering wafers from the mechanism 12.

Desirably, the machine 10 incorporates its own power source. For this purpose an engine 22 is mounted on the frame 14 and power from the engine is delivered by way of a transmission including an output sheave 23. A belt 24 and drum 25, which is carried by a shaft 26, are employed to drive the transfer means and the wafering mechanism 12. Controls for the engine 22 and other operative mechanism of the machine are conveniently positioned in a control panel 29 disposed atop an upwardly and forwardly projecting column 30 at the front end of the frame 14 for ready access by the operator of the draft vehicle.

For illustrative purposes, in FIGURE 1, the machine 10 is shown as it is being drawn through a field the forage crop of which has been previously cut, leaving stubble 32, and deposited in a windrow 33.

The chute 18, which is mounted at the right side of the frame 14, is disposed in an upwardly and rearwardly inclined position. Its forward end is defined by a forwardly projecting sub-frame 18a which is equipped with baffle screens 18b that are pivoted in depending relation from the leading edge of the sub-frame 18a. Enclosed within the chute, adjacent its lower forward end is a rotary flail 35. The flail includes a central shaft 36 which is journaled transversely of the chute and which mounts a series of blades 38. The outer end of each blade is of arcuate paddle form. The blades 38 are pivoted to the shaft 36 in angularly and longitudinally spaced relation. The paths traversed by their paddle-like outer ends overlap. The shaft 36 is rotated in a counterclockwise direction, when viewed from the right side of the machine, such that the tips of the blades in their lower portions of their paths move in the direction of the forward movement of the machine. Thus, they engage, chop and deliver hay or other crop material along with a relatively large volume of air into and through the chute 18. The flail shaft 36, as shown, is driven at high speed from the drum 25 by means of a belt 37 which is entrained about the drum and a sheave 38 affixed to the shaft 36.

The crop material when cut is ordinarily of relatively high moisture content and it is therefore quite heavy. Whether the cut crop material is windrowed or simply is allowed to fall upon the stubble it tends to settle and mat and to press down the stubble and to become entangled with it. This can result in crop loss, and it can impair regrowth of the stubble for subsequent cuttings.

In carrying out the present invention means is provided in advance of the flail 35 for engaging the previously cut crop material as it lies upon the field, lifting it from the stubble, and delivering it to the flail 35. For this purpose the improved wafering machine is equipped with a tined pickup 40 which is located at the forward end portion of the sub-frame 18a. The pickup 40 includes a reel having a central shaft 42 which mounts spiders 43. The latter in turn mount a plurality of sub-shafts 44 for limited pivotal movement with respect thereto. The sub-shafts 44 are angularly spaced with respect to each other about the shaft 42 and each of them mounts spring tines 45. The tines are longitudinally spaced along their respective sub-shafts and their free outer ends extend outwardly therefrom through complementally disposed radial slots defined between stripper plates 48. The rear ends of the stripper plates 48 are fixed with respect to the forward edge of the bottom of the chute 18 and, as shown in the drawings, they curve down and rearwardly to form a unitary trough 48a which serves as a floor for the rotating flail 35. From the forward edge of the bottom of the chute 18 the stripper plates are curved in a generally cylindrical configuration about the tine shaft assembly 42, 44 with their lowermost ends turned rearwardly and extending beneath the pickup 40. Thus the stripper plates 48 and the forwardly projecting sub-frame 18a define an entrance throat, as indicated at 49, to the chute 18 at the flail 35.

A belt and pulley drive is utilized in the exemplary structure to rotate the shaft 42 and with it the sub-shafts 44 and tines 45 with respect to the stripper plates 48. This belt and pulley drive includes a pulley 50 which is non-rotatably secured to the flail shaft 36, a pulley 51 which is non-rotatably mounted upon the pickup shaft 42 and a drive belt 52 which is engaged about the pulleys 50 and 51. The rotation of the pickup assembly 42, 43, 44 and the tines 45 is thus correlated to that of the flail 35 to the end that the projecting free ends of the tines, that extend beyond the stripper plates 45, comb through the stubble, engage and lift the crop material 33, and deliver it upwardly and rearwardly through the entrance throat 49 to the flail 35.

Upon rotation of the flail shaft 36 and with it the blades 38 not only do the blades engage the hay but in doing so chop its stems and leaves and, by virtue of centrifugal force, throw the comminuted crop material upwardly and rearwardly into the upper or forward portion of the chute 18. Additionally, and as a result of the arrangement of the blades 38 as hereinbefore described, the blades operate in the manner of a drum-type fan effectively scooping air and delivering it along with the forage crop particles into the chute 18 at a relatively high velocity. This not only assists in conveying the forage crop particles through the chute but the entrainment of the crop particles delivered by the flail with the turbulent air stream therefrom results in a thorough co-mingling of the chopped crop particles including stems and leaves. Thus there is provided a substantially homogenized mass of loose cut forage. From the chute 18 the homogenized loose mass of cut or chopped crop material is delivered into the hopper 20 of the cross feed or transfer means of the illustrative machine. To direct the crop material from the chute 18 into the hopper 20 an arcuate hood 54 is interposed between the upper end of the chute 18 and the hopper 20.

Provision is made for returning excess air delivered by the flail and through the chute so as to save crop particles remaining airborne and at the same time minimizing the formation of what can be termed an "air block" which would impede transfer of the crop material. For this purpose a divider panel 55 is included in the chute 18 and hood 54. The panel extends entirely across the chute and terminates at a lower end at a point closely adjacent the path of the tips of the flail blades 38. The panel thus divides the chute into two independent passages. It is into the upper or forward passage that the chopped forage crop material entrained in the air stream from the flail is delivered. Excess air and any loose hay particles entrained therein are returned downwardly and forwardly to the flail through the lower or rear passage behind the divider panel 55 into the forward end portion of the chute where they are co-mingled with hay subsequently received from the pickup 40.

I claim as my invention:

1. In a forage crop wafering machine having a mechanism for compacting comminuted crop material into wafers and having means for transferring the material to the mechanism, the combination comprising a closed chute with a passage therethrough, a rotary flail disposed adjacent to and enclosed by a trough-like floor within the forward end of said chute for chopping the crop material and co-mingling its stems and leaves and delivering it to the transfer means, and a reel including outwardly extending spring tines and stripper plates disposed about said reel and defining slots through which said tines project, said reel disposed in advance of and coextensive with said rotary flail for initially engaging previously cut crop material lying in a field, lifting it from the stubble and discharging it to said rotary flail, said stripper plates being fixed with respect to and extending forwardly from said floor at the bottom of said chute whereby said stripper plates and the top of said chute define a throat spaced from said passage and through which crop material lifted from the field by said tines is delivered to said flail.

2. In a forage crop wafering machine for compacting comminuted crop material into wafers and having means for transferring the material to the mechanism, the combination comprising means including a closed chute having first and second passages therethrough, and a rotary flail disposed adjacent to and enclosed by a trough-like floor within the forward end of said chute for chopping the crop material and discharging the same and a stream of air into said first passage for co-mingling of crop particles and delivering them to the transfer means, said second chute passage providing communication between the transfer means and the forward end of the chute for returning excess air and any crop particles carried thereby to the vicinity of said flail for inclusion with subsequent material treated by the flail, and means disposed in advance of said rotary flail and coextensive therewith at the forward end of said chute including a reel having angularly and longitudinally spaced series of tines extending therefrom and having stripper plates defining slots through which said tines project for engaging previously cut crop material lying in a field and combing it from the stubble, said stripper plates extending forwardly from said floor and curving around said reel thereby defining with the juxtaposed portion of said chute a throat communicating with said flail in angularly spaced relation to said passages through which crop material is delivered from said tines to said flail.

References Cited by the Examiner
UNITED STATES PATENTS

| | | | |
|---|---|---|---|
| 2,641,097 | 6/1953 | Mast | 56—1 |
| 2,716,318 | 8/1955 | Skromme | 56—1 |
| 2,955,403 | 10/1960 | McKee. | |

FOREIGN PATENTS 873,713  7/1961  Great Britain.

ABRAHAM G. STONE, Primary Examiner.

ANTONIO F. GUIDA, Examiner.